Aug. 18, 1959 W. H. MITCHELL ET AL 2,900,539
ELECTRIC MOTOR
Filed Feb. 24, 1956 2 Sheets-Sheet 1

WITNESSES
Edwin E. Bassler
Leon M. Garman

INVENTORS
William H. Mitchell
& Richard P. Percy
BY
ATTORNEY (United States Patent Office)

2,900,539

ELECTRIC MOTOR

William H. Mitchell, Lima, and Richard P. Percy, American Township, Allen County, Ohio, assignors to Westinghouse Electric Corporation, East Pittsburgh, Pa., a corporation of Pennsylvania Application February 24, 1956, Serial No. 567,490

3 Claims. (Cl. 310—62)

The present invention relates to electric motors, and more particularly to the construction and ventilation of such motors.

While the invention is not limited to any particular type or size of motor, it is especially useful for motors of relatively small size, such as universal motors for use in domestic appliances. Such motors must be made as small as possible, and they are designed to reduce to a minimum the amount of material required for a given rating, the maximum permissible temperature being the limiting factor in reduction of size.

In the conventional construction of motors of this type, the stator core is in direct contact with the housing of the motor, and the housing becomes quite hot during operation so that it is uncomfortable to the touch, which is very undesirable in motors that are to be used in relatively exposed locations where the user may come in contact with the motor. It is, of course, necessary to provide very effective ventilation for these motors, to keep the size small, and the conventional designs have large ventilating openings, which not only detract from the appearance of the motor but are necessarily located so that the commutator is clearly visible, and the sparking which unavoidably occurs during starting and under heavy loads is quite noticeable through the ventilating openings. The large ventilating openings near the commutator also have a further disadvantage, since the motor cannot be painted after assembly without getting paint on the commutator surface, which is not permissible, so that the end brackets which form the housing must be separately painted before assembly, with resulting possibility of mismatch of the color which is undesirable especially in motors for use in domestic appliances where appearance is quite important. Thus, the conventional design of electric motors of this type has numerous undesirable features which have been unavoidable with the type of construction which has heretofore been used.

The principal object of the present inventon is to provide an electric motor of a new and improved construction which eliminates the objectionable features of conventional designs described above.

A more specific object of the invention is to provide an electric motor in which the stator core is spaced from the housing at all points, so that ventilating air can flow directly over the core between the core and the housing, and with ventilating openings positioned for effective ventilation, but located and shielded in such a manner that there is no direct linear path into the motor extending toward the commutator, so that the commutator is not visible through the ventilating openings, and so that the complete motor can be painted after assembly.

A further object of the invention is to provide an electric motor in which the stator core is supported solely on through bolts which hold the bracket members of the housing in assembled relation, so that the core is spaced from the housing at all points, and so that accurate concentricity of the stator core, with respect to the rotor, can readily be obtained.

Other objects and advantages of the invention will be apparent from the following detailed description, taken in connection with the accompanying drawings, in which.

Figure 1:
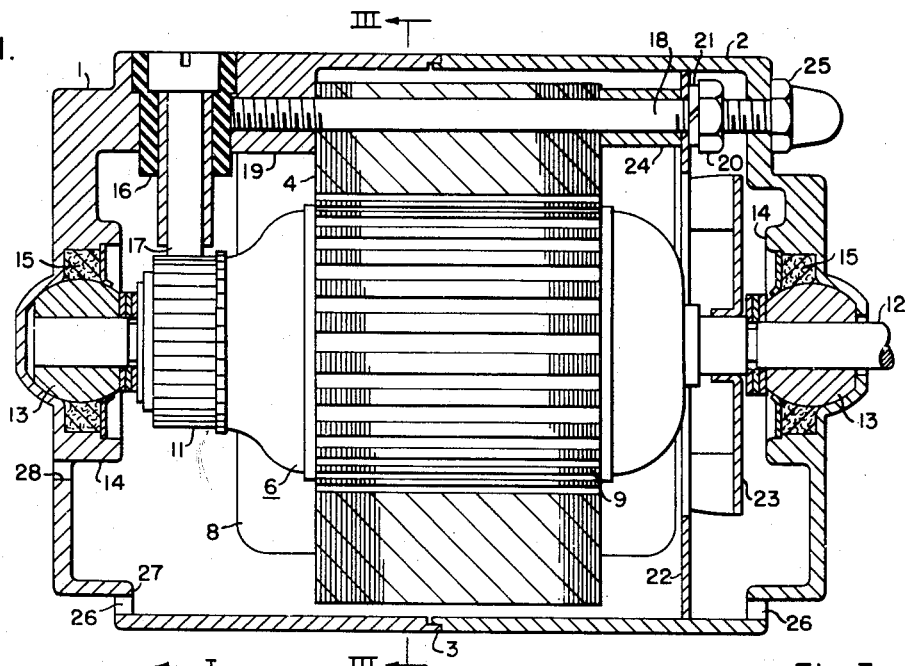
Figure 1 is a longitudinal sectional view of an electric motor embodying the invention, the section being taken substantially on the line I—I of Fig. 2.

The invention is shown in the drawing, for the purpose of illustration, embodied in a small universal motor of fractional horsepower size, although it will be understood that the invention is applicable to motors of any type or size. The particular motor shown in Figs. 1, 2 and 3 of the drawing has a housing which is formed by two cooperating end bracket members 1 and 2. The bracket members 1 and 2 are generally cup-shaped members which are shown as being flat on opposite sides and somewhat curved on the other two sides, although any suitable configuration might be used. The bracket members 1 and 2 are provided with a rabbet fit, indicated at 3, and engage each other to form a housing for the motor, as shown in the drawing.

Figure 3:
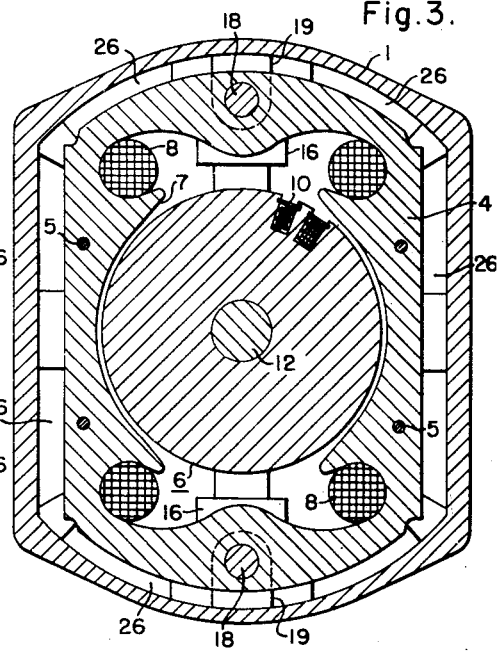
Fig. 3 is a transverse sectional view approximately on the line III—III of Fig. 1.

The motor has a stator core 4 supported in the housing in the manner hereinafter described. The stator core 4 may be generally rectangular in outline, with two sides somewhat curved, as shown in Fig. 3, the housing conforming to the shape of the core, and the core is preferably of laminated construction, the laminations being held together by rivets 5 or in any other desired manner. The core 4 has a central opening to receive the rotor member 6, and has pole portions 7 on which field windings 8 are placed. The rotor 6 may be of any suitable construction, and is shown as having a laminated core 9, carrying a winding 10 of any suitable type connected to a commutator 11, and mounted on a shaft 12. The shaft 12 is supported for rotation in bearings 13 supported in bearing housing portions 14 of the end brackets 1 and 2 which are preferably formed integrally with the brackets, as shown. The bearings 13 may be of any suitable type, and are shown as self-aligning sleeve bearings having a spherical surface engaging a correspondingly shaped supporting surface in the bearing housing portion 14 of the bracket. The bearings 13 may be made of a porous bearing material and may be lubricated by oil soaked wicking 15 packed around them, or in any other suitable manner. Brush holders 16, of any suitable or usual type, are mounted in the end bracket 1 with brushes 17 engaging the commutator 11.

The end brackets 1 and 2 are held together in assembled relation by a suitable number of through bolts 18, two bolts being used in the illustrated embodiment. The bolts 18 extend through openings in the end bracket 2 and are threaded into bosses 19 in the end bracket 1. The bosses 19 are preferably located adjacent the brush holders 16, as shown, and the bolts 18 are tightened against the brush holders to lock them in place. The stator core 4 is supported in the housing on the through bolts 18, and for this purpose is provided with openings through which the bolts pass with a very small clearance to support and accurately position the stator core. The core 4 bears against the bosses 19 to position it longitudinally in the housing, and is held in place by nuts 20 and lock washers 21. In the illustrated embodiment, a baffle 22 is provided to direct ventilating air into a fan 23 carried on the shaft 12, and the baffle 22 is held in place on the bolts 18 by the nuts 20, tubular spacers 24 being placed on the bolts 18 between the baffle and the core 4 to position the baffle close to the fan. Nuts 25 are threaded on the outer ends of the through bolts 18 to clamp the end bracket members 1 and 2 together.

Figure 2:
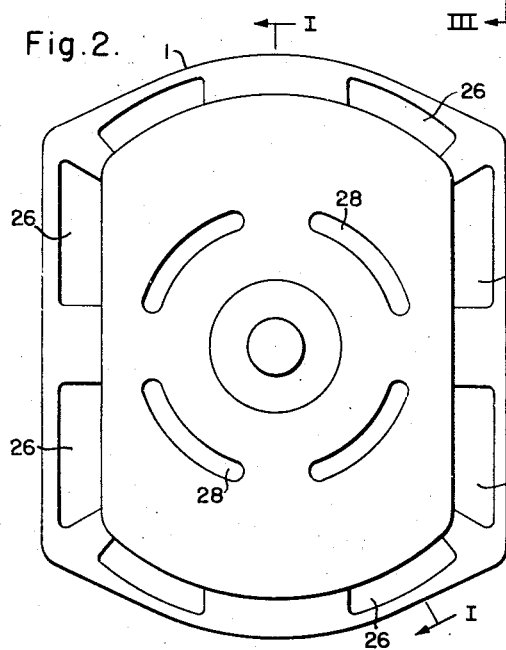
Fig. 2 is an end view of the motor of Fig. 1.

It will be seen that the stator core 4 is supported in the housing solely by the through bolts 18, and that it is spaced from the housing at all points. Very effective ventilation is therefore obtained by directing ventilating air over the outer surface of the core 4 as well as through the air gap between the stator core and the rotor. Ventilating openings 26 are provided in the end brackets 1 and 2 for this purpose, and in order to obtain the most effective flow of air, these openings are located substantially in longitudinal alignment with the space between the stator core and the housing. The openings 26 are made relatively narrow and elongated, as shown in Fig. 2, but they have sufficient area to permit a large flow of air for effective ventilation. The end bracket 1 is provided with an axially extending portion 27 which extends past the openings 26 on the inside of the bracket member. This portion 27 acts as a shielding means to prevent direct observation of the commutator, and it will be seen in Fig. 1 that the arrangement is such that there is no direct linear path through the ventilating openings extending toward the commutator, so that the commutator is not visible from the outside of the motor and any sparking that may occur is not observable. Additional ventilating openings 28 are preferably also provided in the end bracket 1 adjacent the bearing housing portion 14 to provide a flow of ventilating air directly over the commutator 11 to prevent unduly high commutator temperature, and thus to improve the brush life. It will be noted that the position of these openings, with respect to the bearing housing portion 14, is such that the bearing housing effectively shields the openings 28 so that the commutator is not visible through them.

It will now be apparent that a motor construction has been provided which eliminates the objectionable features of conventional constructions previously outlined. Thus, the stator core 4 is spaced from the housing at all points so that ventilating air flows directly over the entire outer surface of the core between the core and the housing. This not only improves the ventilation by very effectively cooling the stator core itself, but also prevents the housing from becoming unduly hot, because the housing is not in contact with the stator core and a layer of relatively cool air flows continuously between the core and the housing. The position of the ventilating openings 26 in alignment with the space between the core and the housing also contributes to the effectiveness of ventilation, since the air flows in a direct path with no change in direction until it reaches the baffle 22 which directs it into the fan to be discharge through the openings in the end bracket 2. The location of the ventilating openings makes it possible to shield the openings to prevent direct observation of the commutator, so that any sparking that may occur is not visible, and since there is no direct linear path extending toward the commutator, the complete motor can safely be painted after assembly without risk of getting paint on the commutator, eliminating the possibility of color mismatch which is unavoidable if the brackets must be separately painted before assembly.

The support of the stator core 4 solely on the through bolts 18 has another important advantage in making it possible to readily obtain the desired accurate concentricity of the stator core with respect to the rotor. In motors of the type described, the end brackets are frequently die cast, and with the conventional construction, in which the core is pressed into the bracket, it has been customary to cast the bearing seat and the internal core-receiving surface of the bracket on the same die, for the purpose of obtaining accurate concentricity. In die casting the bracket, however, it is necessary to provide a draft, or slight internal taper of the bracket, to facilitate removal from the die, and for this reason when the stator core is pressed into such a bracket, the core is frequently not positioned with the desired accuracy because the core must either be somewhat loose in the bracket or it will shear metal from the bracket because of the draft. The core thus tends to be eccentric if it is loose in the bracket, or if it is pressed in tightly, it may become tilted or eccentric because the shearing action is not uniform and also may leave chips which interfere with the proper positioning of the core. Thus, in the conventional construction, it is very difficult to obtain the desired concentricity of the stator core, which frequently results in noisy operation or even in rubbing of the rotor on the stator. In the present construction, however, in which the core is supported solely on the through bolts, this difficulty is eliminated. The bolt holes in the brackets can be cast in the same operation as the bearing seats, so that they are accurately positioned, and the core is mounted on the bolts with a very small clearance so that the bolts accurately position the core in the housing. Thus, the desired concentricity is easily obtained, and quiet operation of the motor is insured.

Figure 4:
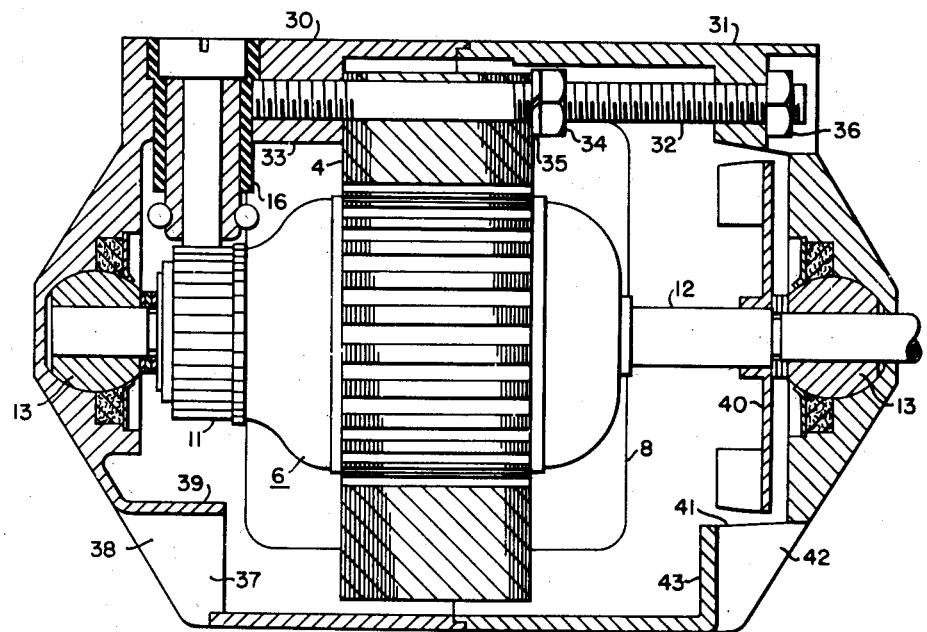
Fig. 4 is a longitudinal sectional view of an electric motor showing a slightly modified embodiment of the invention, the section being taken substantially on the line IV—IV of Fig. 5.
Figure 5:
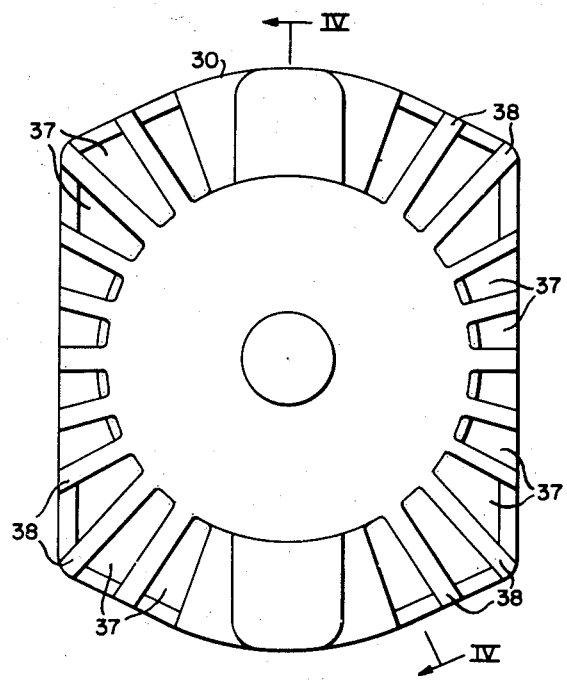
Fig. 5 is an end view of the motor of Fig. 4.

A modified construction, having the same advantages as that previously described, is shown in Figs. 4 and 5. This motor is essentially similar to that of Figs. 1 through 3 but has end brackets of somewhat different construction. The stator core 4 and rotor 6, which may be as previously described, are supported in a housing consisting of end bracket members 30 and 31. The bearings 13 are mounted in the end brackets, and the brush holders 16 are supported in the end bracket 30, all as previously described. The stator core 4 is supported solely on through bolts 32, which extend through openings in the stator core with a very small clearance, and are threaded into bosses 33 in the end bracket 30. The core 4 bears against the bosses 33 to position it longitudinally and is clamped in place by nuts 34 and lock washers 35 on the bolts 32. The brackets 30 and 31 are clamped together by means of nuts 36 threaded on the ends of the through bolts 32.

The brackets 30 and 31 have generally conical central portions in which the bearing seats are formed, and the bracket 30 has ventilating openings 37 adjacent its outer periphery. As shown in Fig. 5, these openings 37 are generally radial and are located so that their outer ends are in longitudinal alignment with the space between the stator core and the housing so that the direction of air flow is essentially the same as in the embodiment of the invention previously described. The openings 37 are separated by web portions 38 of the bracket, which join the central conical portion to the periphery of the bracket, and an axial shielding portion 39 is provided within the bracket extending circumferentially between the webs to direct the air into the motor and to shield the commutator so that it is not visible from the outside of the motor. Air is circulated through the machine by a fan 40 on the shaft, which causes air to enter through the openings 37 and discharges it through openings 41 in the end bracket 31. The openings 41 are closely adjacent the fan 40 and arranged, as shown, so that the air flows radially through them in the direction in which it is discharged by the fan. The openings 41 are separated by radial webs 42, similar to the webs 38, and the bracket 31 has an annular portion 43 adjacent the openings 41, which serves a baffle to direct the air flowing through the motor into the fan 40. It will be seen that the construction of this embodiment of the invention is generally similar to that of Figs. 1 through 3, and that it has the same advantages as those previously described.

It will now be apparent that a new motor construction has been provided which eliminates the objectionable features of previous conventional designs, since it prevents excessive heating of the housing but provides very effective ventilation so that the motor can be made of small physical size for a given rating. The large ventilating openings of the conventional constructions have been eliminated and replaced by less conspicuous openings, which permit adequate flow of ventilating air into the motor, but which do not detract from its appearance, and which are shielded to prevent direct observation of the commutator so that sparking is not noticeable. The new construction also facilitates manufacture of the motor, since the assembly operation is quite simple, and accurate concentricity of the stator core is very easily obtained.

The invention has been described particularly with respect to small universal motors, for the purpose of illustration, but it will be apparent that its usefulness is not limited to this particular type of motor and that it is generally applicable to electric motors of any desired type or size. Certain specific embodiments have been shown and described for the purpose of illustration, but it will also be apparent that various other embodiments and modifications are possible and are within the scope of the invention.

We claim as our invention:

1. An electric motor having a housing, a rotor member supported for rotation in the housing, said rotor member including a commutator at one end thereof, a stator core having windings thereon, means for supporting the stator core in the housing with the outer peripheral surface of the stator core spaced from the housing at all points, the housing having ventilating openings at the ends thereof, the ventilating openings at least at the end of the housing adjacent the commutator being substantially in axial alignment with the space between the stator core and the housing, and shielding means in the housing adjacent the openings at said end disposed so that there is no direct linear path through the openings extending toward the commutator, the flow of ventilating air to the commutator being otherwise unobstructed.

2. An electric motor having a housing, a rotor member supported for rotation in the housing, said rotor member including a commutator at one end thereof, a stator core having windings thereon, means for supporting the stator core in the housing with the outer peripheral surface of the stator core spaced from the housing at all points, the housing having ventilating openings at the ends thereof, the ventilating openings at least at the end of the housing adjacent the commutator being substantially in axial alignment with the space between the stator core and the housing, and the housing having axial portions adjacent the openings at said end disposed so that there is no direct linear path through the openings extending toward the commutator, the flow of ventilating air to the commutator being otherwise unobstructed.

3. An electric motor comprising two generally cup-shaped end bracket members disposed in adjoining relation to form an enclosing housing, a rotor member supported for rotation in said bracket members, said rotor member including a commutator at one end thereof, a plurality of bolts extending longitudinally through the bracket members to hold them in assembled position, and a stator core in the housing having windings thereon, said bolts extending through the stator core and the stator core being supported solely on the bolts and the outer peripheral surface of the stator core being spaced from the housing at all points, the bracket members having openings for ventilating air, the openings at least in the bracket member adjacent said commutator being substantially in longitudinal alignment with the space between the stator core and the housing, and said bracket member having axially extending portions adjacent the openings disposed so that there is no direct linear path through the openings extending toward the commutator.

References Cited in the file of this patent

UNITED STATES PATENTS

| | | |
|---|---|---|
| 1,380,134 | Cook | May 31, 1921 |
| 1,684,168 | Bethal | Sept. 11, 1928 |
| 1,892,997 | Oldenburg | Jan. 3, 1933 |
| 1,996,476 | Krause | Apr. 2, 1935 |
| 2,081,454 | Hollander | May 25, 1937 |
| 2,100,020 | Andrews | Nov. 23, 1937 |
| 2,301,156 | Behlen | Nov. 3, 1942 |
| 2,662,195 | Fisher | Dec. 8, 1953 |

FOREIGN PATENTS

| | | |
|---|---|---|
| 995,059 | France | Aug. 14, 1951 |